United States Patent
Klimczak et al.

(10) Patent No.: US 12,172,375 B2
(45) Date of Patent: *Dec. 24, 2024

(54) APPARATUS, SYSTEM AND METHOD FOR TEMPERATURE MAINTENANCE OF A FILAMENT MELT IN AN ADDITIVE MANUFACTURING PRINT HEAD

(71) Applicant: JABIL INC., St. Petersburg, FL (US)

(72) Inventors: Scott Klimczak, St. Petersburg, FL (US); Luke Rodgers, St. Petersburg, FL (US); Darin Burgess, St. Petersburg, FL (US)

(73) Assignee: JABIL INC.

( * ) Notice: Subject to any disclaimer, the term of this patent is extended or adjusted under 35 U.S.C. 154(b) by 85 days.

This patent is subject to a terminal disclaimer.

(21) Appl. No.: 17/417,045

(22) PCT Filed: Dec. 19, 2019

(86) PCT No.: PCT/US2019/067417
§ 371 (c)(1),
(2) Date: Jun. 21, 2021

(87) PCT Pub. No.: WO2020/132209
PCT Pub. Date: Jun. 25, 2020

(65) Prior Publication Data
US 2022/0072777 A1    Mar. 10, 2022

Related U.S. Application Data

(60) Provisional application No. 62/782,468, filed on Dec. 20, 2018.

(51) Int. Cl.
*B29C 64/209* (2017.01)
*B29C 64/393* (2017.01)
(Continued)

(52) U.S. Cl.
CPC .......... *B29C 64/209* (2017.08); *B29C 64/393* (2017.08); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 5,340,433 A * | 8/1994 | Crump | G05B 19/41 156/218 |
| 2010/0046317 A1* | 2/2010 | Grunitz | B29C 48/92 366/76.1 |

(Continued)

FOREIGN PATENT DOCUMENTS

| | | |
|---|---|---|
| CN | 204526173 U | 8/2015 |
| CN | 106808692 A | 6/2017 |

(Continued)

OTHER PUBLICATIONS

Choi, Woo Hyoung. Machine Translation of KR20160125614A (Temperature adjustment apparatus of 3D printer extruder). 2022. (Year: 2022).*

(Continued)

*Primary Examiner* — Farah Taufiq
*Assistant Examiner* — Jonathan B Woo
(74) *Attorney, Agent, or Firm* — Riverside Law LLP

(57) ABSTRACT

Apparatus, system and method having two hobs suitable to receive and extrude therebetween a print material filament for the additive manufacturing; a material guide suitable to receive the extruded print material filament; a heater element coupled to a transition point along the material guide distally from the at least two hobs, wherein the transition point comprises a partial liquefication of the print material within the material guide by the heater element to allow for printing of the partially liquefied print material; at least one peltier (Continued)

device at least partially about an upper aspect of the transition point and suitable to at least sink heat from the upper aspect of the transition point to thereby preclude partial liquefication of the print material above the upper aspect; and a print nozzle in fluid communication with the liquefied print material and suitable to print the liquefied print material.

18 Claims, 10 Drawing Sheets

(51) Int. Cl.
*B33Y 30/00* (2015.01)
*B33Y 50/02* (2015.01)

(56) References Cited

U.S. PATENT DOCUMENTS

| | | | |
|---|---|---|---|
| 2015/0190968 A1* | 7/2015 | Griszbacher | B33Y 50/02 264/40.6 |
| 2017/0252820 A1 | 9/2017 | Myerberg et al. | |
| 2018/0111336 A1* | 4/2018 | Mantell | B05C 5/02 |
| 2018/0304530 A1* | 10/2018 | Nadvornik | B29C 64/209 |
| 2019/0118258 A1* | 4/2019 | Sachs | B29C 64/393 |
| 2020/0094562 A1* | 3/2020 | Rhee | B29C 64/321 |

FOREIGN PATENT DOCUMENTS

| | | | | |
|---|---|---|---|---|
| CN | 206870375 U | | 1/2018 | |
| KR | 20160125614 A | * | 11/2016 | ......... B29C 67/0085 |
| WO | WO-2017063618 A1 | * | 4/2017 | ............. B29C 48/05 |
| WO | WO-2017152142 A1 | * | 9/2017 | ............ B22F 1/0059 |
| WO | WO-2018213559 A1 | * | 11/2018 | ........... B29C 64/106 |

OTHER PUBLICATIONS

International Search Report for PCT/US2019/067417, dated Jun. 25, 2020.
Written Opinion of the International Searching Authority for PCT/US2019/067417, dated Jun. 25, 2020.

* cited by examiner

APPARATUS, SYSTEM AND METHOD FOR TEMPERATURE MAINTENANCE OF A FILAMENT MELT IN AN ADDITIVE MANUFACTURING PRINT HEAD

CROSS-REFERENCE TO RELATED APPLICATIONS

The present application claims benefit to International Application PCT/US2019/067417, filed Dec. 19, 2019, entitled: "Apparatus, System and Method for Temperature Maintenance of a Filament Melt in an Additive Manufacturing Print Head," which claims priority to U.S. Provisional Application No. 62/782,468, filed Dec. 20, 2018, the entirety of which is incorporated herein by reference as if set forth in its entirety.

BACKGROUND

Field of the Disclosure

The present disclosure relates to additive manufacturing, and, more specifically, to an apparatus, system and method for temperature maintenance of a filament melt in an additive manufacturing print head.

Description of the Background

Additive manufacturing, including three dimensional printing, has constituted a very significant advance in the development of not only printing technologies, but also of product research and development capabilities, prototyping capabilities, and experimental capabilities, by way of example. Of available additive manufacturing (collectively "3D printing") technologies, fused deposition of material ("FDM") printing is one of the most significant types of 3D printing that has been developed.

FDM is an additive manufacturing technology that allows for the creation of 3D elements on a layer-by-layer basis, starting with the base, or bottom, layer of a printed element and printing until the top, or last, layer via the use of, for example, heating and extruding thermoplastic filaments into the successive layers. Simplistically stated, an FDM system includes a print head from which the print material filament is fed through a material guide to a heated nozzle, an X-Y planar control for moving the print head in the X-Y plane, and a print platform upon which the base is printed and which additionally moves in the Z-axis as successive layers are printed.

More particularly, the FDM printer nozzle heats the thermoplastic print filament received through the material guide from the print head to a semi-liquid state, and typically deposits the semi-liquid thermoplastic in variably sized beads along the X-Y planar extrusion printing path plan provided for the building of each successive layer of the element. The printed bead/trace size may vary based on the part, or aspect(s) of the part, then-being printed. Further, if structural support for an aspect of a part is needed, the trace printed by the FDM printer may include removable material to act as a sort of scaffolding to support the aspect of the part for which support is needed. Accordingly, FDM may be used to build simple or complex geometries for experimental or functional parts, such as for use in prototyping, low volume production, manufacturing aids, and the like.

However, the use of FDM in broader applications, such as medium to high volume production, is severely limited due to a number of factors affecting FDM, and in particular affecting the printing speed, quality, and efficiency of the FDM process. As referenced, in FDM printing it is typical that a thermoplastic is extruded from the print head, and then heated to a semi-liquid state and pushed outwardly from the print nozzle, under controls operating pursuant to the print plan, onto either a print plate/platform or a previous layer of the part being produced. The nozzle is moved about by the robotic X-Y planar adjustment of the print head in accordance with the pre-entered geometry of the print plan, such as may be entered into a processor, to control the robotic movements to form the part desired.

However, current limitations on the cost, efficiency, and performance of FDM additive manufacturing often occur due to the nature of known print heads, material guides, nozzles and filament heaters (may be collectively referred to herein as "print head"). In short, in a typical known print head, print material is fed from a spool through two (or more) print hobs that serve to extrude the print material through a material guide toward the "hot end", i.e., the heater and the print nozzle output, of the printer. In known embodiments, a motor turns either or both hobs having the print material therebetween in order to feed the print material from the spool through the material guide to the "hot end" that includes the print nozzle.

Accordingly, in some printers such as FDM printers, there is a "transition point" at which the "cold", i.e., unmelted, filament in the material guide is heated to the point of liquefication for printing. However, the temperature control that provides for the "transition point" to the hot end, i.e., the point at which the "cold" filament begins to soften under heat so as to allow for printing, must be highly refined, at least because the feed speed of the material must be well-matched to the print speed needed for different aspects of each layer to be printed, and the feed speed is dependent on a number of factors, including: the melt speed of the cold filament entering the transition point; and the avoidance of clogging as the cold filament enters the transition point. That is, if the cold filament melts or softens before the transition point due to unintended "early" exposure to heat or to the melt, or does not melt until after the transition point, the filament may undesirably harden at the transition point, and thereby form a clog that may cause the cessation of printing. Yet further, once a clog develops at the cold side of the transition point, it is very difficult to clear in the known art, at least in part because the print head assembly typically includes no heater at the cold end of the print head.

In the known art, it is thus typical that a heat sink or sinks, such as may additionally include air or water cooling, is included adjacent to the transition point on the "cold side" thereof. This inclusion is intended to prevent heat leakage "upward" to the cold side of the print head, and to thereby prevent unintentional partial melting of the filament, which early melting often leads to clog formation at or near the transition point, as discussed above. However, to the extent water cooling, for example, is employed at the area above the transition, a variety of fittings and piping are needed to carry the coolant to the cool side, which impedes the workspace around the printhead, which adds to the complexity of print head manufacture and integration, and which thus makes the print head inefficient and expensive to manufacture and deploy.

There are, of course, additional challenges to cooling aspects of the print head, as will be appreciated by the skilled artisan. For example, the thin-walls of the material guide around the transition point, which are provided to reduce the heat transfer to the cool side, are not particularly robust, and as such are not suitable for high-level production of print heads having such features.

Thus, there exists a need to maintain the "cold" filament in an unmelted state until it passes through the transition point in a FDM system, which thereby avoids clogging and improves available print speed and print efficiency.

SUMMARY

The disclosure is of and includes at least an apparatus, system and method for a print head for additive manufacturing. The apparatus, system and method may include at least two hobs, one of which may be driven, suitable to receive and extrude therebetween a print material filament for the additive manufacturing; a material guide suitable to receive the extruded print material filament; at least one heater element coupled to a transition point along the material guide distally from the at least two hobs, wherein the transition point comprises an at least partial liquefication of the print material within the material guide by the at least one heater element to allow for printing of the at least partially liquefied print material; at least one peltier device at least partially about an upper aspect of the transition point and suitable to at least sink heat from the upper aspect of the transition point to thereby preclude partial liquefication of the print material above the upper aspect; and a print nozzle in fluid communication with the at least partially liquefied print material and suitable to print the at least partially liquefied print material.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
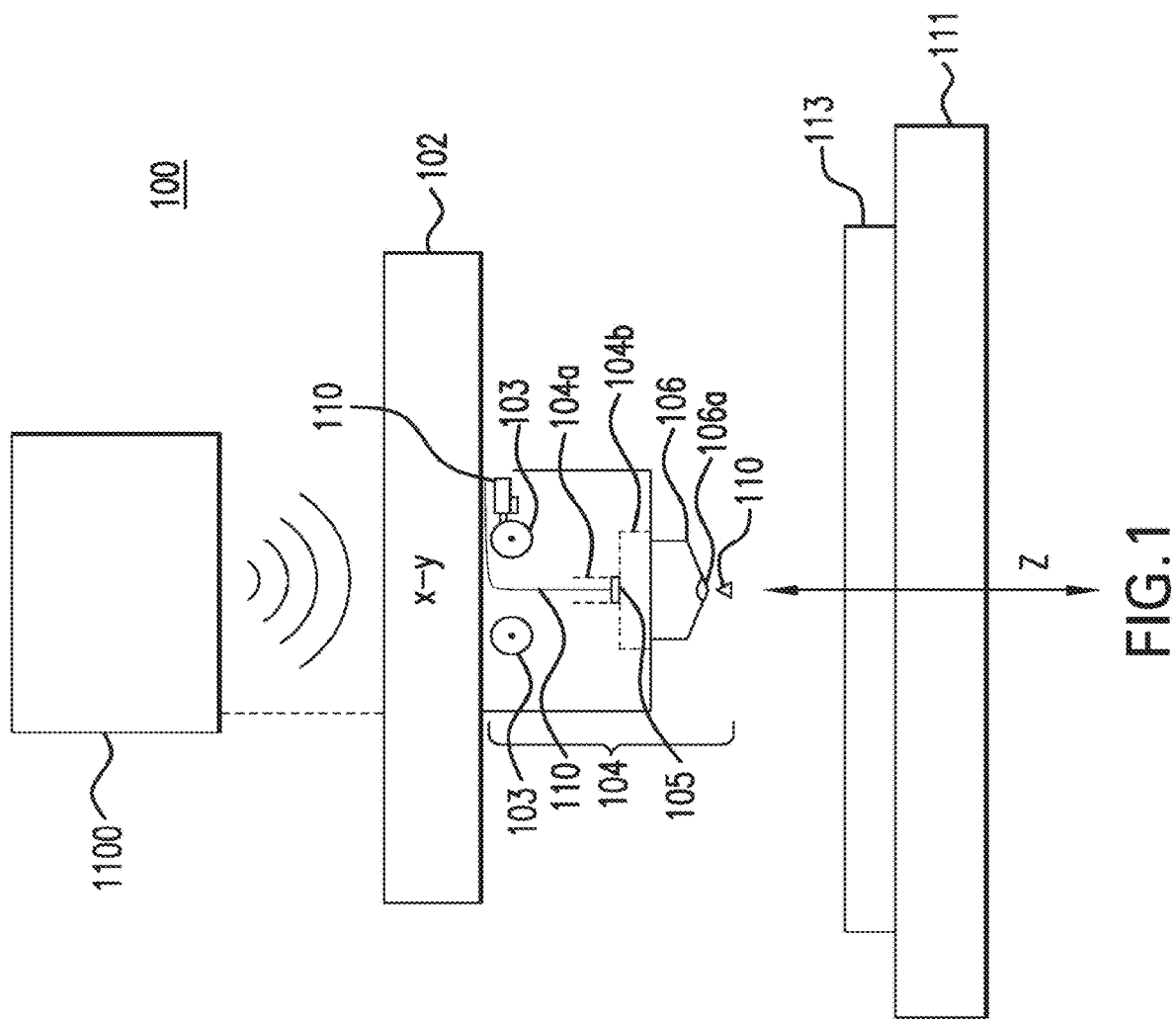
FIG. 1 is an illustration of an additive manufacturing printer.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

Simply put, one or more Peltier devices in the embodiments may maintain the filament in a print head of an additive manufacturing printer at or below a predetermined temperature, such as the glass transition temperature for the given filament. The aforementioned Peltier device(s) may be subjected to one or more controllers in order to optimally carry out this temperature maintenance.

The foregoing helps avoid "creep" of the melt "upward" from the transition point, which creep may lead to clogging. This creep may occur as the heat from the heating element is conducted upward into the material guide, and/or from radiated heat passing upwardly within the material guide from the melted print material "below". If the heat unintentionally reaches the "cold side" of the transition point, the material not subjected to the heater may melt. Needless to say, this unintentional melt cannot be well controlled, as it is not subjected to the heater, and thus there is a risk that, upon cooling, even slightly, this material will form a clog.

The integration in the known art of liquid and/or air cooling to maintain the temperature on the "cool" side of the transition point, in order to avoid "creep" of the melt, is costly and difficult, and has several significant disadvantages. By way of example, providing liquid in an environment that is highly populated with electronics may cause catastrophic failure of the electronics, such as in the event of a leak or condensation. Air coolers are, of course, also common place, but they add air flow into what is necessarily a highly controlled environment, which may adversely affect other print process parameters.

It should be noted in the disclosure throughout that "upward," "below", and similar relative terms, as used herein, are not necessarily indicative of the physical position of aspects of the embodiments, but rather are indicative of where in the print process an aspect occurs, i.e., a print hob is "upward" of the heater in a typical FDM system, at least because the hob operates on the print material before the print material is exposed to the heater in a typical FDM system. Correspondingly, the use of such terminologies herein is explicitly non-limiting as to the disclosed embodiments.

More specifically, the embodiments provide active cooling, such as in the form of one or more Peltier devices, that: drives temperatures at the transition point to or below the Tg (glass transition temperature) but with a decreased heat sink area; drives to the given temperature quickly; allows for the driving of the print material at variable speeds; drives the transition area to much cooler temperatures, such as at least 10 to 20 degrees cooler, as compared to a standard heat sink; and may include heating optionality, such as to aid in clearing inlet plugs.

Accordingly and as discussed herein, embodiments are provided: in which print head speed may be improved without the referenced detrimental effects, such as clogging; in which printing precision at higher print speeds may be improved; in which printing responsiveness to variations in the print plan is improved; and in which weight and size of the heat sinks needed in the print head to maintain the "cold" filament, and thus the weight and size of the print head itself, may be decreased.

FIG. 1 is a block diagram illustrating an exemplary FDM printer 100. In the illustration, the printer includes an X-Y axis driver 102 suitable to move the print head 104, and thus the print nozzle 106, in a two dimensional plane, i.e., along the X and Y axes. Further included in the printer 100 for additive manufacturing are the aforementioned print head 104, which includes material guide 104a, heater 104b, and print nozzle 106. As is evident from FIG. 1, printing may occur upon the flow of heated print material outwardly from the nozzle 106 along a Z axis with respect to the X-Y planar movement of the X-Y driver 102. Thereby, layers of printed material/print filament 110 may be provided from the nozzle 106 onto the build plate 111 along a path dictated by the X-Y driver 102 to form layers 113.

Figure 2:
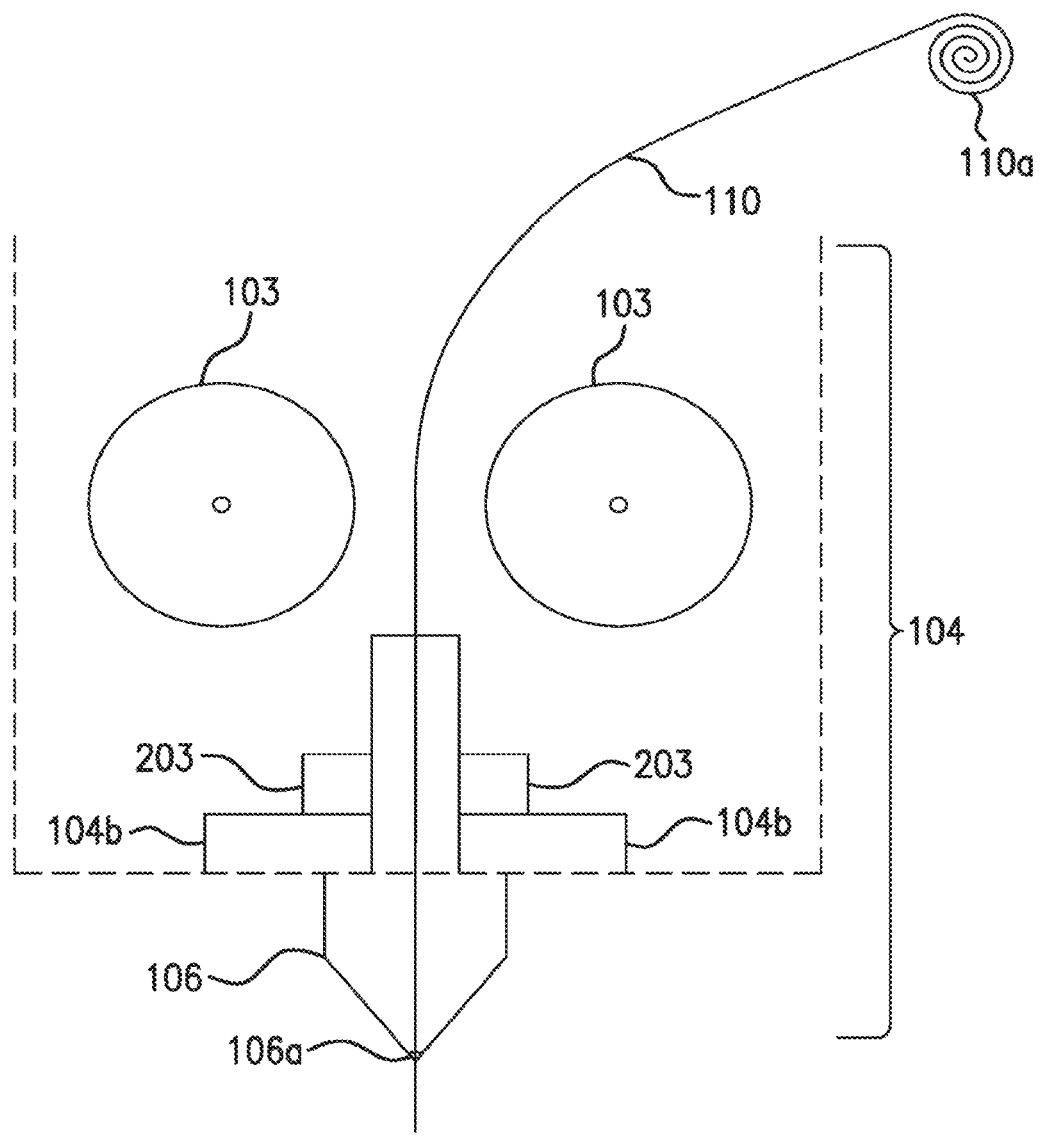
FIG. 2 is an illustration of an exemplary additive manufacturing system.

FIG. 2 illustrates with greater particularity a print head 104, material guide 104a, heater 104b and nozzle 106 system for an exemplary additive manufacturing device, such as a 3-D printer, such as a FDM printer. As illustrated, the print material 110 is extruded via hobs 103 of the head 104 from a spool of print material 110a into a material guide 104a, through which the material 110 reaches the transition point 105, at which point heater 104b heats the print material 110 to at least a semi-liquid state so that the print material 110 may be printed through the nozzle 106. That is, as the heater 104b heats the print material 110, the print material is at least partially liquefied to traverse through the nozzle 106 for output from the end port 106a of the nozzle at a point along the nozzle distal from the print head 104. Thereby, the extruded material is "printed" outwardly from the port 106a along the Z axis and along a X-Y planar path determined by the print plan 1190 executed by the controller 1100 associated with the print head 104.

More particularly, the print head 104 serves the function of extruding the print filament 110 into the material guide 104a, and thus to the transition point 105, at the speed dictated by the rotation of the hobs 103 associated with the print head 104 and controlled by control system 1100. More particularly, it is desirable that the print head 104 be enabled to go from significant filament feed speed to zero speed, and from zero to significant filament feed speed, readily and without clog formation at or near the transition point 105. More specifically, the filament 110 may be fed by the print head 104 through the material guide 104a and into the hot end 106 in such a manner that "cold" and "hot" zones may exist which enable the maintenance of the cold filament as cold until the transition point, after which transition zone the melted material may pass through the nozzle 106 for discharge of the melted filament from the print port 106a.

In relation to the discussion herein throughout, the location and temperature of (and on either "side" of) the transition point 105 may vary with the nozzle/print head type, and/or with the type of print material 110. It should also be noted that the transition point may vary as to the adjacent geometry of the print system.

As shown, the print head 104 feeds print material filament 110 into the upper portion of the material guide 104a, and the heat applied by the heater 104b to the filament 110 causes a portion of the filament 110 to melt as it passes through transition point 105. It will be appreciated that, if the speed at which the hobs 103 of the print head 104 feed the filament 110 to the heater 104b exceeds the melting capabilities of the system, the unmelted portion of the print filament 110 will penetrate through the transition point 105 and may clog the nozzle 106. Thereby, a physical and algorithmic association 104a of the rate of rotation of the hobs, and the melting capacity of the heater 104b to melt the print filament 110 for printing may be employed in the disclosed embodiments. This algorithmic association 104a may additionally include the other temperature controls discussed throughout, which may include an assessment of data generated by one or more sensors 107 such as may be communicatively associated with control system 1100.

A Peltier device 203 is a thermoelectric device which uses the Peltier effect to create a heat flux between the junction of two different types of materials. A Peltier device 203 is a solid-state active heat pump which transfers heat from one side 205a of the device to the other 205b, with consumption of electrical energy, depending on the direction of the current flow. That is, the heat transfer performed by the Peltier device 203 may be reversed by a reverse in polarity. As such, the Peltier device 203 may be advantageously used for heating or for cooling, as referenced throughout, and thus is suitable for use as a temperature controller. It should be noted that the more heat moved using a Peltier thermocouple, the less efficient it may become, at least because the thermocouple must dissipate both the heat being moved and the heat generates by the Peltier device's own power consumption. An additive manufacturing print head 104 having at least one Peltier device 203 associated therewith is illustrated in FIG. 2.

Figure 3:
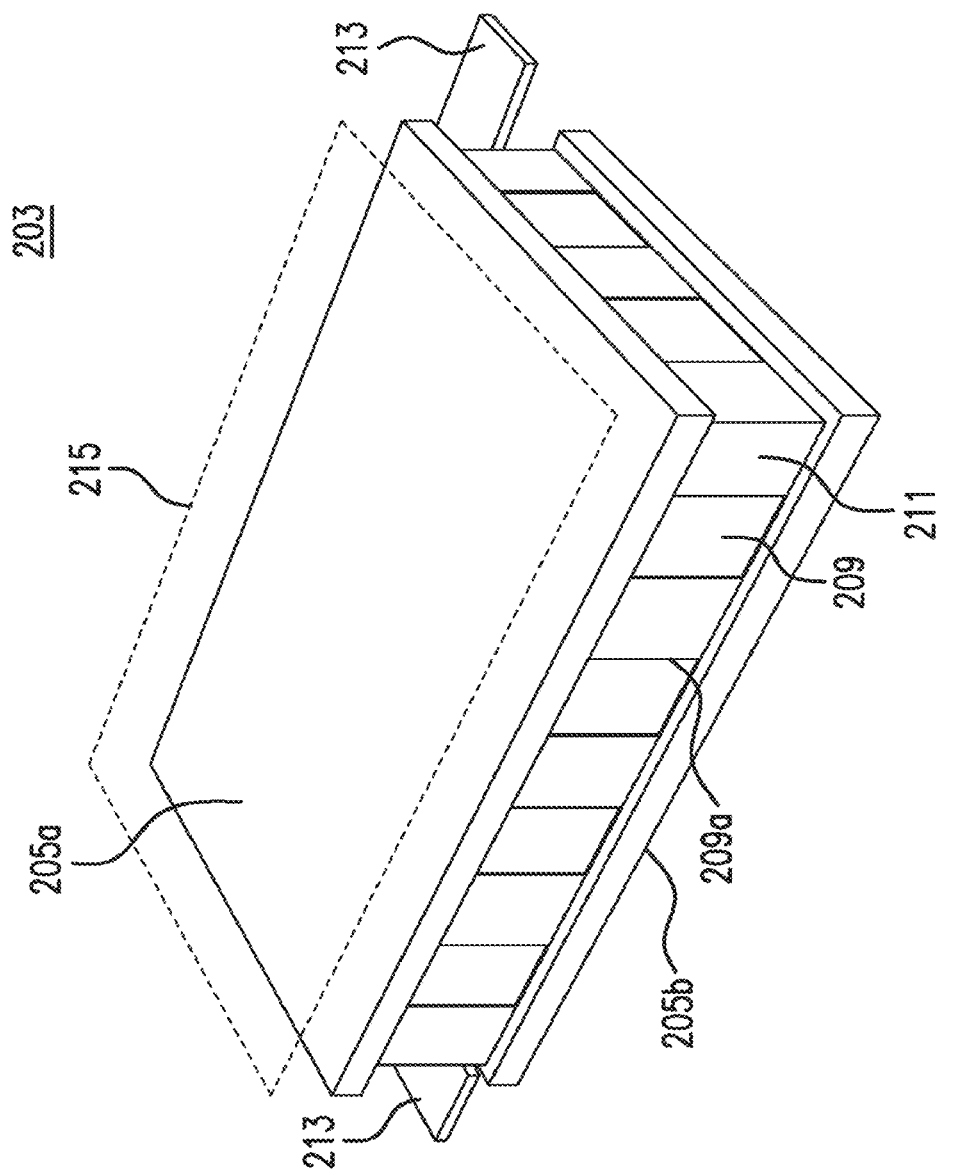
FIG. 3 illustrates an exemplary Peltier device system.

More specifically and with reference now also to FIG. 3, when operated as a cooler, a voltage is applied across the device, and a difference in temperature builds up between the two sides 205a, 205b based on the application of power to the junctions that make up the device. For example, when operated as a heater, upon application of power on side 205a of the device is electrically heated to a temperature greater than the other side 205b, and, as a result, acts as a heat sink for that other side.

A Peltier device 203 provides significant advantages over other types of cooling, such as those types discussed above and conventionally used in 3D printing, and include the lack of moving parts, airflow that contaminates the print environment, or circulating liquid that may leak or condensate. Consequently, the embodiments provide longer life, invulnerability to leaks, smaller size, flexible shape, and enhanced manufacturability, in part through the use of Peltier cooling of the cold side of the transition point 105.

More particularly and again with reference to FIG. 3, a Peltier device 203 in the embodiments includes two unique semiconductors 209, 211, one a n-type and one a p-type. The semiconductors 209, 211 are thermally in parallel to each other and are electrically in series, and are associated with a thermally conducting plate 205a, 205b on each side of the P-N semiconductor grid 209, 211.

When a voltage is ultimately applied via electrical connection 213 to the semiconductor grid 209, 211, there is a flow of DC current across the P-N junctions 209a of the semiconductors 209, 211, which current flow causes a temperature differential. Accordingly, the cooling plate face 205b of the device absorbs heat, which is then moved to the other side 205a of the device 203 across the semiconductor thermocouples 209, 211, causing a heat sink. The device's conductive plates 205a, 205b may further be sandwiched between outer ceramic plates 215.

The amount of heat that can be absorbed by the Peltier device 203 is proportional to the current therethrough and the exposure time. More particularly, the heat absorbed, Q, relates to the current, I, and time, t, by the Peltier coefficient, P, as follows:

$$Q=PIt$$

where the Peltier coefficient, P, is dependent upon the temperature and the materials that make up the P-N thermocouple.

Figure 4:
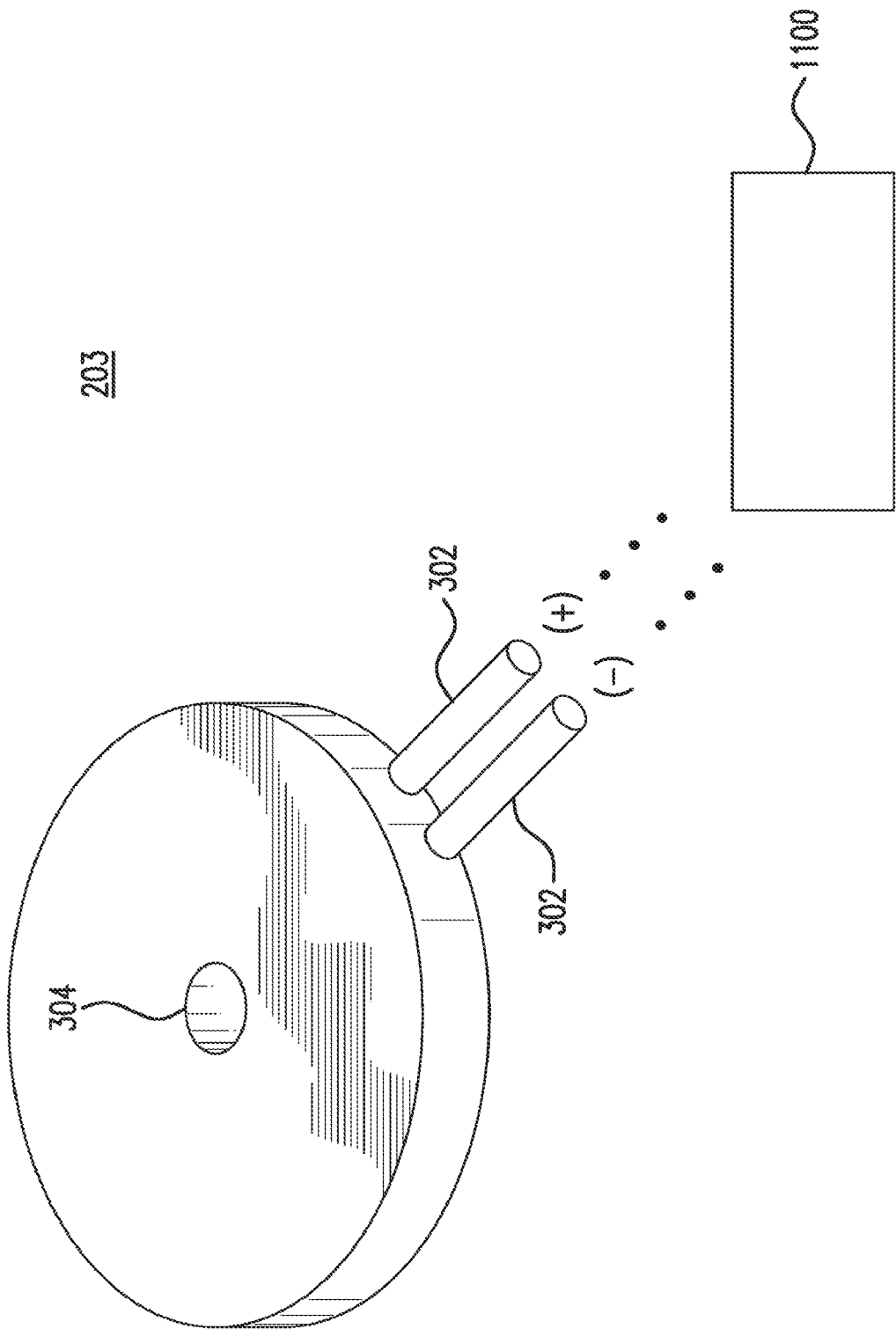
FIG. 4 illustrates an exemplary Peltier device system.

FIG. 4 illustrates an exemplary Peltier device 203 that may be used in the embodiments. As illustrated, electricity may be supplied via wires (+) and (−) 302, such as to the electrical conductors 205a, 205b discussed above with respect to FIG. 3. Accordingly, the polarity of the Peltier device 203 may be controlled using these wires 302, such as when subjected by controller 1100 to control over the electricity supplied, as discussed herein.

The Peltier device 203 may be placed in the print assembly, such as at or near the transition point 105. Accordingly, when energy is applied a Peltier device 203 adjacent to the transition point 105, the Peltier device may actively "cool", by sinking heat from, the area just above the transition point 105.

A number of geometries for the Peltier device 203, including that shown in FIGS. 3 and 4, may be employed in order to best integrate with the design of the print head 104. Embodiments may include, for example, a disk or block Peltier device with an opening 304 at the center thereof, through which the material guide 104a and transition point 105 may pass. Such an embodiment is illustrated in FIG. 5.

Figure 5:
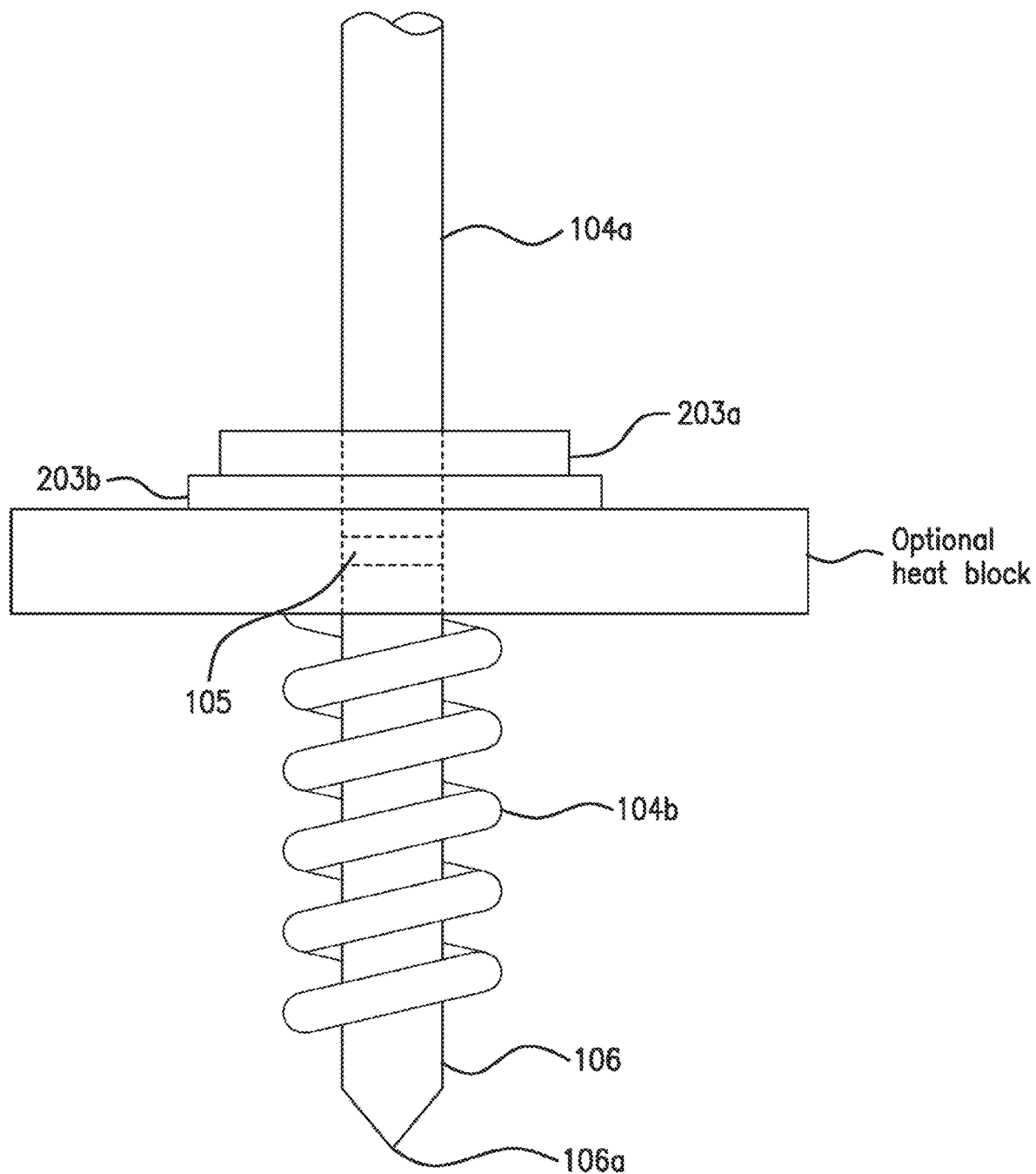
FIG. 5 illustrates an exemplary Peltier device system.

As shown in the example of FIG. 5, one or more disk or block Peltier devices 203 may be placed about the material guide 104a adjacent to the transition point 105. On the side of the transition point opposite the "cold side" is shown a heater 104b. To the extent multiple Peltier devices 203a, b are included, one device 203b, such as nearest the "hot side" of the transition point 105, may be used as a heater, and one device 203a, such as on the "cold side" of the transition point 105, may be typically used as a cooler. Of course, in this or similar embodiments, in the event a clog develops, all Peltier devices 203a, b associated with the clogged transition point 105 may be controlled to heat, such that the clog is melted.

Figure 6A:
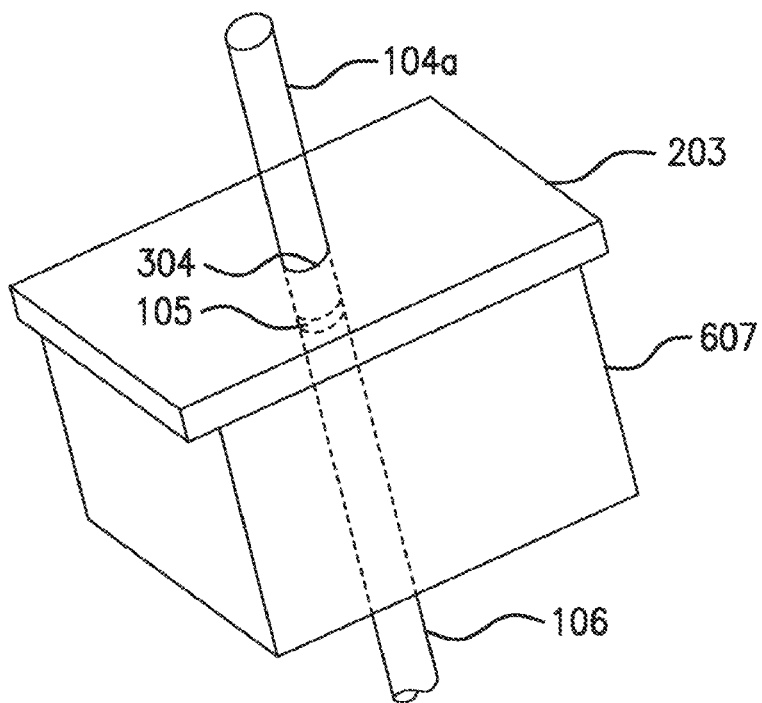
FIG. 6 illustrates an exemplary Peltier device system.
Figure 6B:
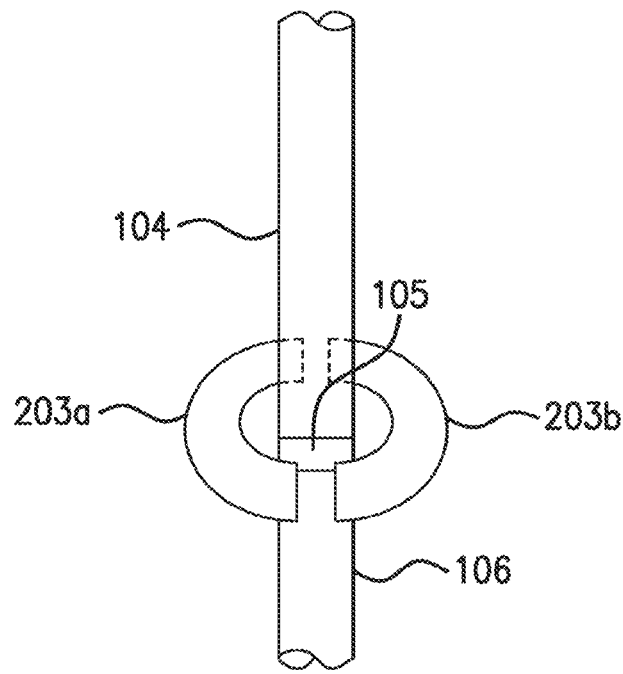

FIGS. 6A and 6B illustrate embodiments of Peltier cooling at the transition point 105 discussed throughout. In the illustrated cross-sectional view of FIG. 6A, the Peltier cooler 203 is a block cooler having a centered hole 304 through which passes the print material guide 104a—that is, the Peltier cooler 203 is placed about the material guide 104a at/just above the transition point 105. Also shown is a heating block 607 having a high thermal mass, and a print nozzle 106 having a low thermal mass. In FIG. 6B, the illustration includes Peltier coolers 203a, 203b placed aside the transition point 105, rather than fully about the transition point 105 as in FIG. 6A.

It goes without saying that focusing the heating and cooling at the transition point 105, i.e., at the contact point of the material guide 104a to the hot end heater 104b, optimizes the capability of the Peltier cooler 203 or coolers to prevent and clear clogging. As such, a Peltier cooler optimized to the geometry of that contact point, as referenced throughout, may be best suited to perform the cooling and heating discussed herein.

Accordingly, embodiments may include a Peltier cooler 203 or coolers that reside radially around the contact point just above the transition point 105. Such a radial embodiment may include a Peleitr device 203 or devices having a hole at the center thereof 304 as referenced above, or may include multiple small Peltier devices 503 connected radially about a heat transferring connective plate 505 having a center hole 304 therein to secure the devices around the contact point 105.

Figure 7A:
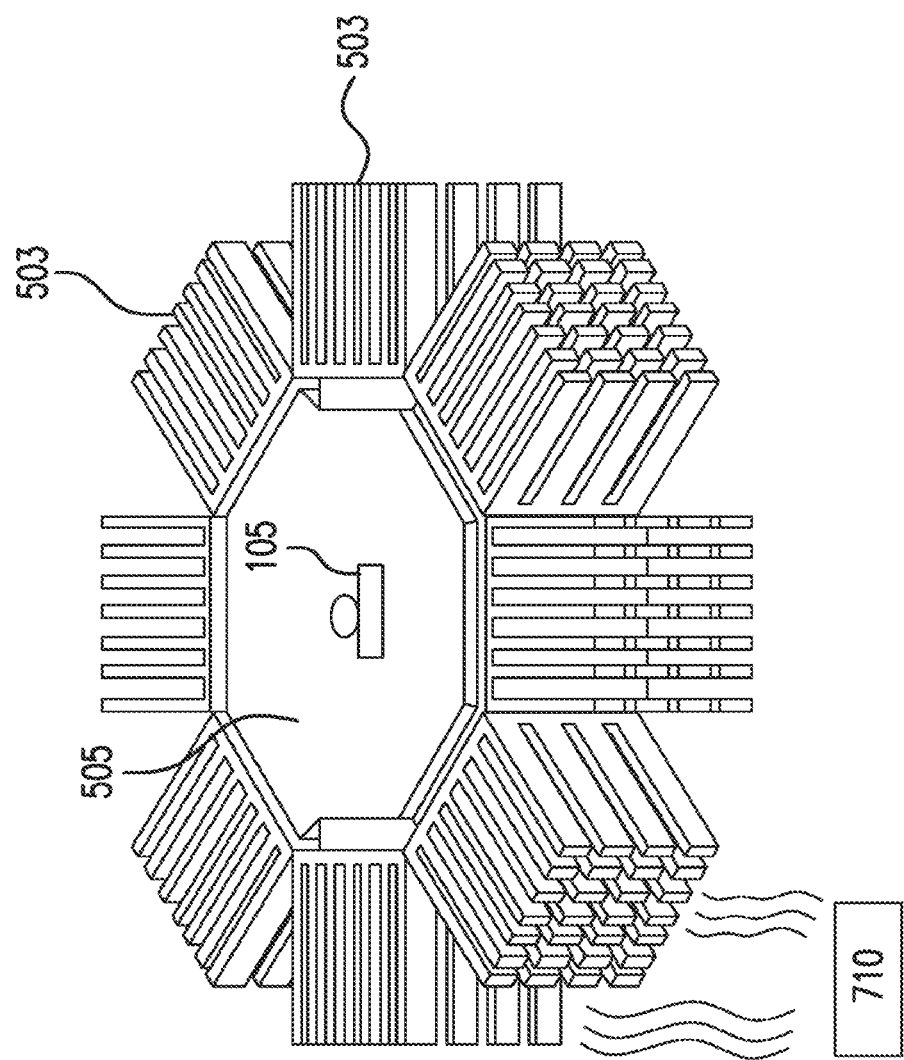
FIGS. 7A and 7B illustrate exemplary Peltier device systems.
Figure 7B:
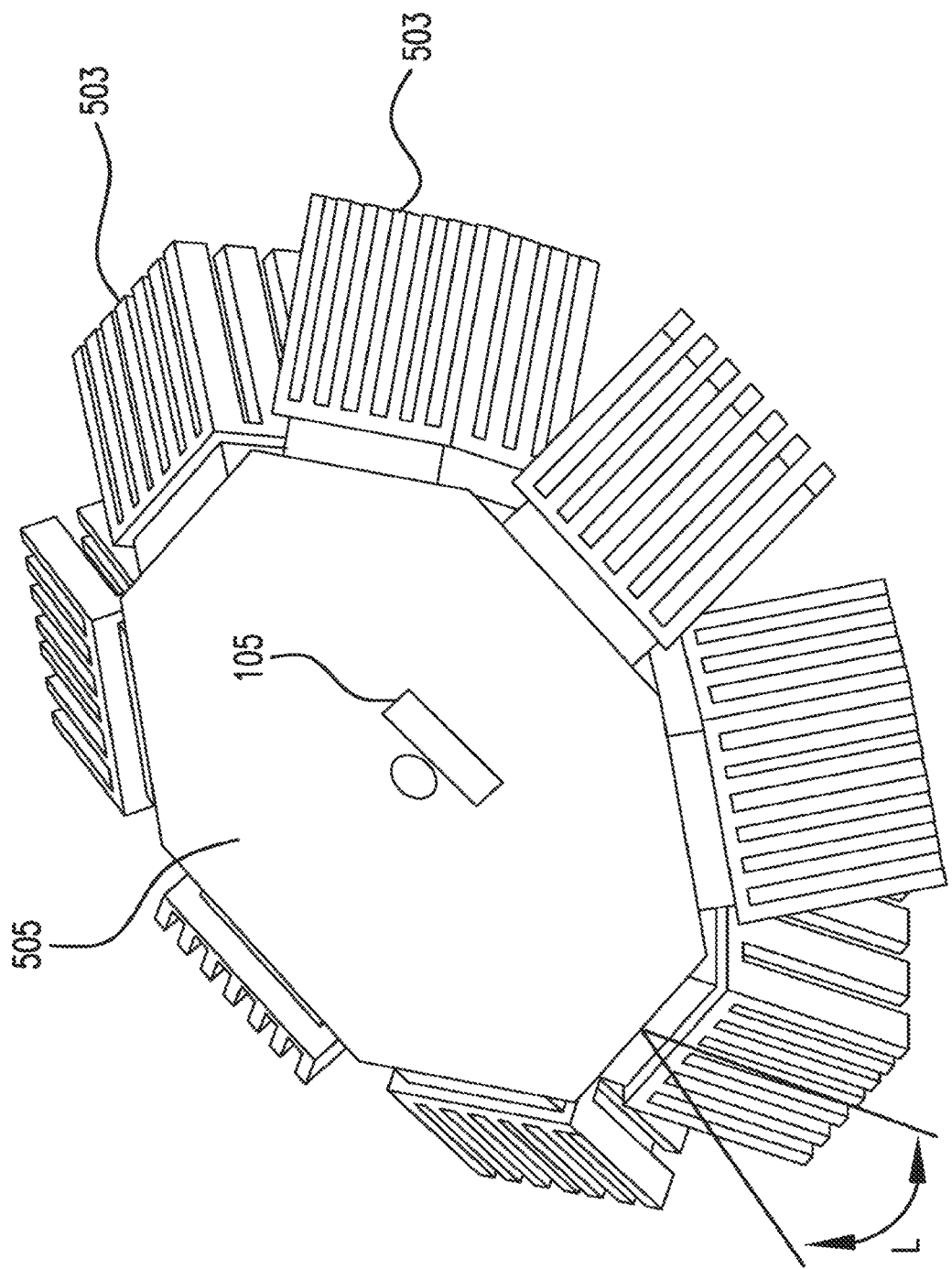

By way of non-limiting example, FIGS. 7A and 7B illustrate a plurality of Peltier devices 503 placed radially around the contact point 105 at the center thereof. Of note, although an octagonal pattern of Peltier devices 503 is illustratively provided in FIG. 7, it will be appreciated in light of the discussion herein that other numbers of smaller radial Peltier devices 503 may be provided, such as four, six, or ten, by way of non-limiting example.

More particularly, FIG. 7A illustrates eight Peltier devices 503 placed radially about a center point, to perform the functionality discussed throughout. It should be noted that the Peltier devices 503 in FIG. 7A share a top plane with the heat transferring plate 505 around the contact point 105.

In contrast, FIG. 7B again illustrates eight Peltier devices 503 radially arranged about the contact point 105, but the Peltier devices 503 in this example are angled downwardly from a parallel plane to the top plane of the heat transferring plate 505. It will be appreciated that, in such an embodiment, the heat transferred from the upper portion of the devices 503 illustrated, i.e., at the upper plane of the heat transferring plate 505, is well-directed in this illustration toward the lower aspects of the transition point 105. That is, in this illustration, the heat is better transferred to the desired point, i.e., the melt point, of the print material's travel through the nozzle, and away from the "cold end".

It will be understood that the Peltier devices disclosed herein, including the devices of FIGS. 3-7, may be produced using known methodologies, such as inclusive or exclusive of the P-N doped areas discussed above. By way of example, the disclosed Peltier devices may be manufactured via 3D printing, injection molding, and the like.

Further, the disclosed Peltier systems are not preclusive of the use of known art cooling methodologies for the "cold side". For example, heat or heated air may further be removed by a Peltier device system through the use of air cooling 710 over the Peltier device. However, in contrast to the known art, in which the air cooling may stray from solely cooling at the transition point to improperly cool the heated side of the transition point, the embodiments may use air cooling in conjunction with the Peltier device to provide highly directed cooling. That is, the volume of air needed in the known art to cool is significant as compared to the air flow that may be employed in conjunction with a Peltier device in the embodiments, and this large volume of air in the known art greatly increases the likelihood that some of the air in the known art will cool off-target.

More particularly, and as shown in FIGS. 3-7, the Peltier device removes the heat at precisely the desired location by providing a cooling surface at precisely that desired location. The air cooling 710 referenced above, to the extent provided, may be provided only at the "hot side" of the Peltier device, to thereby enhance the cooling provided by the "cool side" of the Peltier device. Consequently, and in contrast to the known art, the air is much more highly targeted and lower volume, and there is no cooling air flow near to the material guide. Moreover, this directed air flow, while screened from the material guide, allows for encapsulation of the air flow in a chamber specifically around the heat sink areas, which also allows for the heated air to be captured and evacuated from this specific chamber. Thus, the embodiments may eliminate stray airflow, and its detrimental effects on the 3D printing process.

Figure 8:
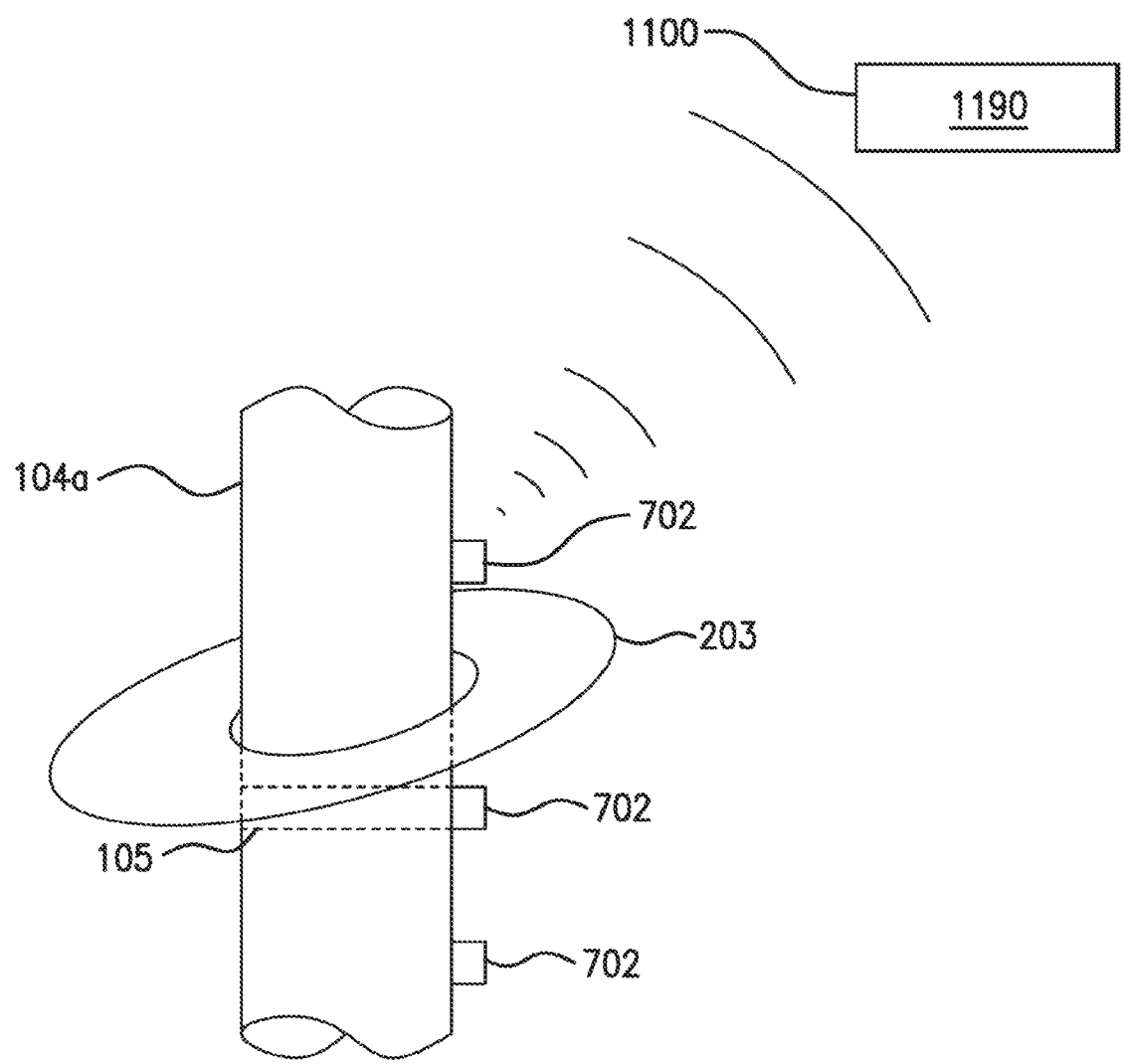
FIG. 8 illustrates an exemplary Peltier device system.

Inclusive or exclusive of the use of cooling airflow, the disclosed Peltier devices 203 enable high precision temperature control. By way of example, and as illustrated in FIG. 8, one or more temperature sensors 702 may be provided on or in environmental association with the print head 104, such as along the material guide 104a and/or at the transition point 105 discussed throughout. This sensor(s) 702 may be communicative with one or more control systems 1100 employing one or more control algorithms 1190 that control, for example, the power supplied to the Peltier device 203/503 (and as discussed above in FIGS. 3-7) and/or, to the extent present, to the air cooling systems discussed with respect to FIGS. 7, to provide a real-time responsive thermal control system. Of course, other aspects may be controlled by algorithm(s) 1190 in conjunction with the Peltier device control, such as the hob 103 actuation by motors, and the like, by way of non-limiting example.

Accordingly, the disclosed Peltier cooling, such as in conjunction with air cooling and/or real-time control as discussed above, provides significantly lower temperatures and better temperature control above the transition point, and a significantly higher temperature delta between the heating block and the transition point, than is provided in the known art. The ability to maintain the "cool side" of the transition point below the glass transition temperature, such as at 60 C instead of the 100 C of the known art, provides distinct process advantages over the known art. By way of example, the enhanced cooling provided by the embodiments enables improved mechanical pushing properties for the speed and power with which the print material may be pushed through the print nozzle.

By way of further non-limiting example, the embodiments allow for a look-ahead by the controller 1100 at the print plan, and consequent adjustment of the temperature at the transition point to allow for an increase/decrease in print material push pressure based on the upcoming print action in the print plan. More particularly, if the transition point is kept very cool, more energy is required by the heating block to melt the print material in the liquefier, and if the transition point is less cool or is heated by a Peltier device, more force may be applied to the print filament, which may allow for higher speed printing.

That is, with the enhanced control systems and Peltier cooling discussed herein, the transition area may be kept much cooler than in the known art, such as in the range of 60 C, heated to near the glass transition temperature during normal run time, and heated to higher temperatures for high speed run time and/or clog-clearing. Moreover, operation parameters may be specifically varied for certain print runs. By way of example, to the extent a particular filament is less likely to form a plug upon a heightened push force, such as due to the stiffness of that filament, more heating to or above the glass transition temperature may be enabled at the transition point, such as to allow for higher speed printing.

In the foregoing example, not only may the Peltier cooling be particularly controlled, but similarly and as discussed throughout, the polarity of the Peltier device may be reversed to provide heating, such as pre-heating, of the print material, such as to enable higher speed printing. For example, a typical Peltier device may heat to 200 C or more.

Figure 9:
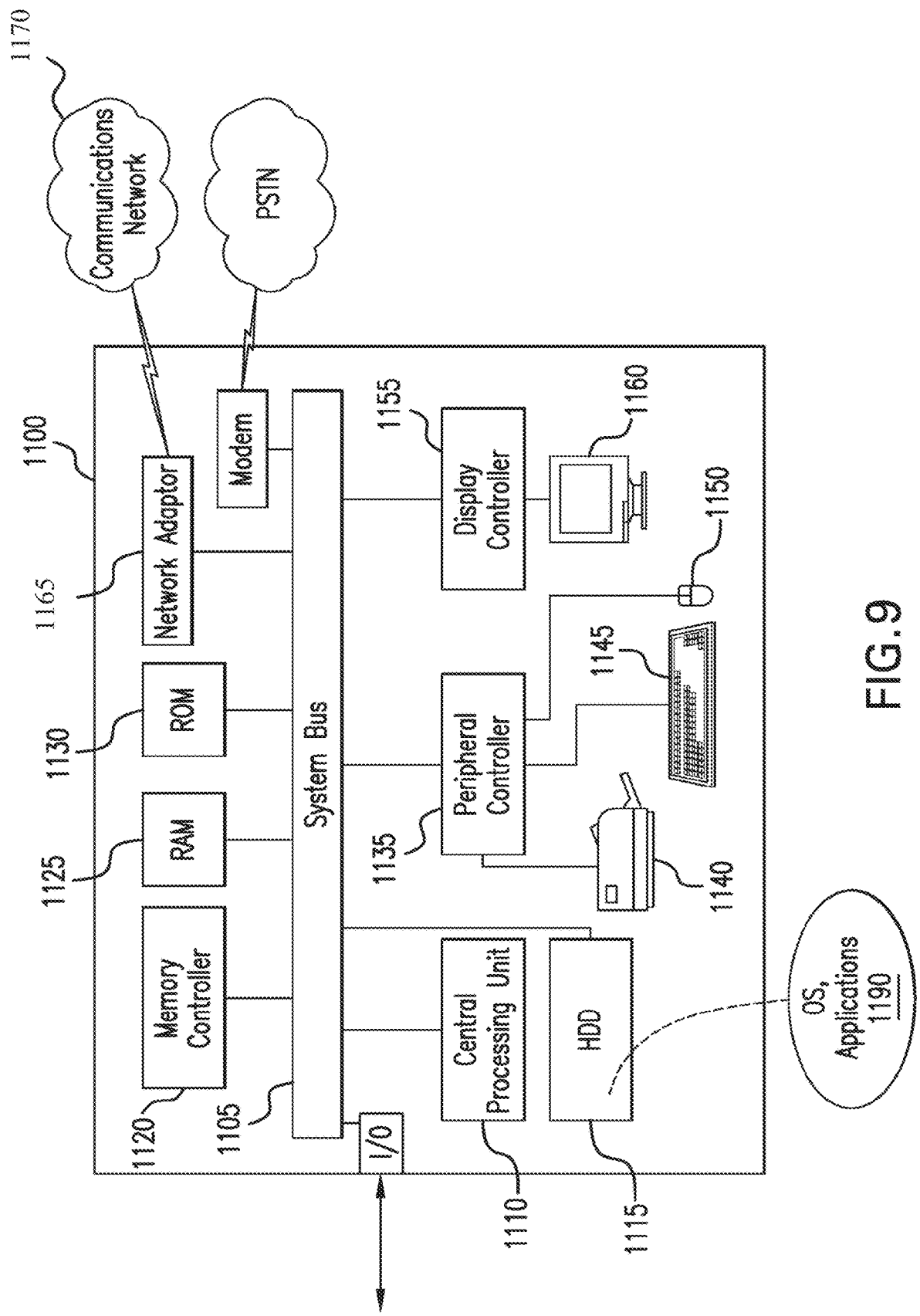
FIG. 9 illustrates an exemplary computing system.

FIG. 9 depicts an exemplary computing system 1100 for use in association with the herein described systems and methods. Computing system 1100 is capable of executing software, such as an operating system (OS) and/or one or more computing applications 1190, such as applications applying the print plans/algorithms discussed herein, and may execute such applications, such as to control one or more hobs 103, heaters 104b, or the like, such as by sending or receiving data to/from, and/or by processing data from, one or more sensors 702, such as may be received at or sent through the illustrated I/O port.

By way of example, algorithm 1190 may control operation of the Peltier cooling discussed throughout. For example, algorithm may actuate Peltier device(s) only when the aforementioned creep is detected, or may simply fully actuate the Peltier cooling during any print operation. Moreover, algorithm 1190 may additionally operate one or more Peltier devices to optionally heat and cool, as discussed above, such as in the event a clog is sensed and must be melted in order to allow for clearing. Of course, in such an instance, once the clog was sensed as being cleared, the Peltier device(s) may be returned by algorithm 1190 to normal cooling operations.

The operation of exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software such as an operating system (OS), executable programs such as algorithm 1190, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 1135, which is responsible for communicating instructions from CPU 1110 to, and/or receiving data from, peripherals, such as peripherals 1140, 1145, and 1150, which may include printers, keyboards, and/or the sensors, encoders, and the like discussed herein throughout. An example of a peripheral bus 1135 is the Peripheral Component Interconnect (PCI) bus.

Display 1160, which is controlled by display controller 1155, may be used to display visual output and/or presentation generated by or at the request of computing system 1100, responsive to operation of the aforementioned computing programs, such as algorithm 1190. Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, a short range wireless communication technology such as Bluetooth®, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A system for additive manufacturing to implement a designed transition point and prevent melting or hardening of a print filament before or after the designed transition point, comprising:
   a print head comprising:
      at least two hobs rotating at a rate of rotation, at least one of which is driven, suitable to receive and extrude there between the print material filament for the additive manufacturing;
      a material guide suitable to receive the extruded print material filament from the at least two hobs;

at least one heater element coupled to the designed transition point, wherein the at least one heater element runs along the material guide and is coupled distally from the at least two hobs, wherein the designed transition point comprises a physical location at which occurs an at least partial liquefication of the print material within the material guide by the at least one heater element to enable printing of the at least partially liquefied print material;

a plurality of peltier devices placed radially around and fanning out tangentially from the material guide adjacent the designed transition point but closer to the at least two hobs, which the plurality of peltier devices are capable of heating and sinking heat imparted adjacent the designed transition point to thereby shift the at least partial liquefication of the print material within the material guide to locations closer to the at least two hobs than the designed transition point;

a heating block, wherein the heating block is positioned about the designed transition point so as to encompass the designed transition point;

at least one sensor; and a controller comprising at least one processor; and a memory storing instructions, that when executed by the at least one processor, causes the at least one processor to perform operations of:

determining a clog by the at least one sensor sensing the rate of rotation of the two hobs; and transmitting a signal to actuate the plurality of peltier devices to clear the clog by the shifting of the at least partial liquefication.

2. The system of claim 1, wherein the material guide passes through a port approximately centered through the radial plurality of peltier devices.

3. The system of claim 1, wherein at least a portion of the plurality of peltier devices is at least partially 3D printed.

4. The system of claim 1, wherein the plurality of peltier devices is at least partially injection molded.

5. The system of claim 1, wherein the plurality comprises between five and eight.

6. The system of claim 1, wherein the plurality of radial peltier devices comprise a downward angle from a top plane thereof.

7. The system of claim 1, wherein the controller is suitable for executing a print plan.

8. The system of claim 7, wherein the controller varies a print speed in accordance with cooling capabilities of the plurality of peltier devices.

9. The system of claim 8, further comprising a plurality of sensors communicative with the controller for sensing performance of the plurality of peltier devices.

10. The system of claim 7, wherein the plurality of peltier devices are suitable to heat the designed transition point.

11. The system of claim 1, further comprising an air cooler.

12. The system of claim 11, further comprising an air chamber immediately adjacent to a hot face of the plurality of peltier devices for receiving air from the air cooler.

13. The system of claim 1, further comprising a print nozzle in fluid communication with the at least partially liquefied print material and suitable to print the at least partially liquefied print material.

14. The system of claim 1, wherein the at least one heater element comprises an elongated body, wherein the elongated body runs along the material guide.

15. The system of claim 14, wherein the elongated body comprises a coil wound around and along the material guide to create the elongated body.

16. A system for additive manufacturing to implement a designed transition point and prevent melting or hardening of a print filament before or after the designed transition point, comprising:

a print head comprising:

at least two hobs rotating at a first rate of rotation, at least one of which is driven, suitable to receive and extrude there between the print material filament for the additive manufacturing;

a material guide suitable to receive the extruded print material filament from the at least two hobs;

at least one heater element at or around the designed transition point, wherein the at least one heater element runs along the material guide and is positioned distally from the at least two hobs;

a heating block positioned at or around the designed transition point;

at least one peltier device placed on or proximal to a top surface of the heating block that is distal to a bottom surface of the heating block, wherein the at least one peltier device comprises an n-type semiconductor and a p-type semiconductor capable of sinking heat or heating adjacent to the designed transition point to cause shifting of partial liquification of the print material filament;

at least one sensor; and a controller comprising at least one processor; and a memory storing instructions, that when executed by the at least one processor, causes the at least one processor to perform operations of:

increasing speed of the at least two hobs to a second rate of rotation;

determining a clog by the at least one sensor and associated with the second rate of rotation; and transmitting a signal to actuate the plurality of peltier devices to clear the clog by the shifting of the partial liquification of the print material filament.

17. The system of claim 16, wherein the at least one peltier device comprises a disk geometry.

18. A system for additive manufacturing to implement a designed transition point and prevent melting or hardening of a print filament before or after the designed transition point, comprising:

a print head comprising:

at least two hobs rotating at a first rate of rotation, at least one of which is driven, suitable to receive and extrude there between the print material filament for the additive manufacturing;

a material guide suitable to receive the extruded print material filament from the at least two hobs;

at least one heater element coupled to the designed transition point along the material guide distally from the at least two hobs, wherein the designed transition point comprises a physical location at which occurs an at least partial liquefication of the print material filament within the material guide by the at least one heater element to enable printing of the at least partially liquefied print material filament;

one or more peltier devices capable of sinking heat to cool and to heat the print material filament based on an electricity supplied to thereby shift the at least partial liquification of the print material filament; and a heating block positioned about the designed transition point, wherein the one or more peltier devices are in contact with the heating block to allow for transfer of thermal energy between the one or more peltier devices and the heating block;

a controller comprising at least one processor; and a memory storing instructions, that when executed by the at least one processor, causes the at least one processor to perform operations of:

decreasing speed of the at least two hobs to a second rate of rotation;

transmitting a signal to sink heat from the designed transition point by controlling the electricity supplied to the one or more peltier devices to cause shifting of the at least partially liquefied print material.

* * * * *